United States Patent
Shepherd

(10) Patent No.: US 10,301,828 B2
(45) Date of Patent: May 28, 2019

(54) UNDERLAYMENT MATERIAL

(71) Applicant: JUMPSTART CONSULTANTS, INC., Wilmington, NC (US)

(72) Inventor: Christopher Shepherd, Issaquah, WA (US)

(73) Assignee: JUMPSTART CONSULTANTS, INC., Wilmington, NC (US)

( * ) Notice: Subject to any disclaimer, the term of this patent is extended or adjusted under 35 U.S.C. 154(b) by 0 days.

(21) Appl. No.: 15/908,088

(22) Filed: Feb. 28, 2018

(65) Prior Publication Data
US 2018/0245349 A1    Aug. 30, 2018

Related U.S. Application Data

(60) Provisional application No. 62/464,622, filed on Feb. 28, 2017.

(51) Int. Cl.
*E04D 12/00* (2006.01)
*B32B 5/02* (2006.01)
*E04D 5/10* (2006.01)
*B32B 27/36* (2006.01)
*B32B 27/12* (2006.01)

(52) U.S. Cl.
CPC ............ *E04D 12/002* (2013.01); *B32B 5/022* (2013.01); *B32B 27/12* (2013.01); *B32B 27/36* (2013.01); *E04D 5/10* (2013.01); *B32B 2262/0276* (2013.01); *B32B 2307/7265* (2013.01); *B32B 2307/744* (2013.01); *B32B 2419/06* (2013.01)

(58) Field of Classification Search
CPC ......... E04D 12/002; E04D 5/10; B32B 27/12; B32B 27/36; B32B 5/022; B32B 2419/06; B32B 2307/7265; B32B 2262/0276; B32B 2307/744
USPC .......................................................... 52/408
See application file for complete search history.

(56) References Cited

U.S. PATENT DOCUMENTS

| | | | | |
|---|---|---|---|---|
| 5,593,766 A | * | 1/1997 | Woiceshyn | B32B 5/26 442/32 |
| 5,687,517 A | * | 11/1997 | Wiercinski | B32B 3/28 52/177 |
| 6,103,356 A | | 8/2000 | Messenger | |
| 8,202,579 B2 | * | 6/2012 | O'Keefe | B32B 27/12 427/385.5 |
| 9,982,437 B2 | * | 5/2018 | Barrego | E04D 12/002 |
| 2005/0227086 A1 | * | 10/2005 | Murphy | B32B 27/32 428/423.1 |
| 2006/0165949 A1 | * | 7/2006 | Segars | D06N 7/0081 428/85 |
| 2007/0151171 A1 | * | 7/2007 | McClintick | E04D 1/14 52/87 |
| 2011/0033685 A1 | * | 2/2011 | Folkersen | B32B 11/02 428/219 |

(Continued)

*Primary Examiner* — Jeanette E Chapman
(74) *Attorney, Agent, or Firm* — Flynn Thiel, P.C.

(57) ABSTRACT

An underlayment material made of a laminate of a nonwoven thermoplastic fabric having a dimensional stability of less than 1% when exposed to a temperature of 82° C. when tested in accordance with ASTM D 1204 in both machine- and cross-directions and a thermoplastic barrier layer provides a combination of an improved dimensional stability, resistance to sliding along a roof deck and protection as a moisture barrier when used in roofing and flashing structures.

11 Claims, 2 Drawing Sheets

(56) References Cited

U.S. PATENT DOCUMENTS

| | | | |
|---|---|---|---|
| 2013/0255755 A1* | 10/2013 | Chich | H04B 5/0037 |
| | | | 136/251 |
| 2014/0259972 A1* | 9/2014 | Feuer | E04D 7/00 |
| | | | 52/58 |
| 2015/0376353 A1* | 12/2015 | Takebe | B29C 70/345 |
| | | | 428/161 |
| 2017/0190146 A1* | 7/2017 | Shen | B32B 5/02 |

\* cited by examiner

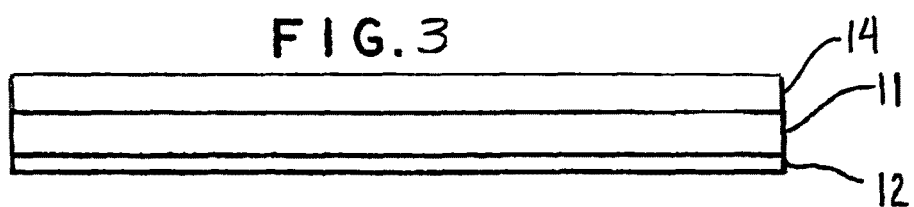
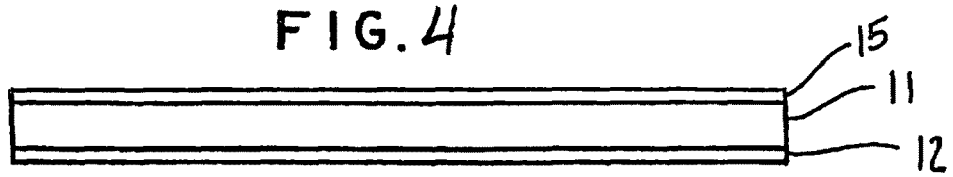

UNDERLAYMENT MATERIAL

CROSS-REFERENCE TO RELATED APPLICATION

This claims the benefit of U.S. Provisional Application No. 62/464,622, filed Feb. 28, 2017, the disclosure of which is hereby incorporated by reference in its entirety.

FIELD OF THE INVENTION

The present invention relates to an underlayment material which can be used in a roofing structure having an external roofing material and an internal roofing material comprising the underlayment. The inventive underlayment material can also be used as a flashing material in building construction to prevent the passage of water into a structure at locations such as chimneys, vent pipes, walls, windows and door openings. The underlayment material of the present invention has improved moisture barrier properties at fastener locations through a combination of improved fastener-sealing dimensional stability and coefficient of friction properties.

DESCRIPTION OF THE RELATED ART

Roofing assemblies for buildings typically include a roofing underlayment material positioned between a structural deck and an external roofing material. The external roofing material, such as asphalt shingles, tiles, wooden shakes, slate tiles, metal roofing, or the like, is intended to provide protection from external weather conditions like wind, rainwater, and snowmelt. In order to further protect against moisture and other elements, which may pass under the external roofing materials, the roofing underlayment is installed over the roof deck and under the external roofing material to provide an added waterproof barrier. The additional moisture protection provided by the roofing underlayment is particularly necessary with tile roofs, where gaps often exist between the tiles where moisture can pass through.

Conventionally, there are three basic types of roofing underlayment used beneath roofing materials. These include asphalt-saturated felt, self-adhering and a non-bitumen synthetic material. The felt underlayment is water-resistant, but not waterproof, and may fail for a number of reasons including a poor quality, loss of volatile components, UV exposure accelerating its deterioration and installation damage. The felt underlayment also fails to provide improved sealing around mechanical fasteners.

Self-adhering underlayment materials incorporate membranes, which are typically comprised of bituminous rubberized asphalt, hot-melt adhesive, butyl adhesive or acrylic adhesive. The self-adhering underlayment is protected by a peel-off membrane, which when removed, provides for the self-adhering underlayment to be adhesively applied to the roof deck without fasteners. These self-adhering underlayments can have a variety of different exposed surfaces including films, textiles and granular layers and may be fiber-reinforced and have a mineral coating on the weather surface. The adhesive qualities of these types of underlayments provide for improved sealing around mechanical fasteners, such as staples and nails.

Typically, mechanically-attached synthetic underlayments in housing construction incorporate a textile component for strength, which typically comprises a woven thermoplastic fabric. The woven thermoplastic fabric incorporates individual annealed strands, which are woven at 90-degree intervals. The woven thermoplastic fabric will typically be extrusion coated with a thermoplastic barrier layer comprising polypropylene, polyethylene, thermoplastic elastomers and combinations thereof to provide water resistance and anti-slip properties. A problem associated with conventional mechanically-attached synthetic underlayments is their tendency to leak at fastening points. Due to the annealed nature of the individual strands, the mechanically-attached synthetic underlayments tend to fracture along the grain direction of the annealed strand when punctured with a mechanical fastener during the installation process, leaving an opening between the fastener and the underlayment material. This opening exhibits a tendency to leak when exposed to bulk moisture.

To overcome the fracturing described above, nonwoven textiles have been employed to provide targeted strength properties. The random orientation of the filaments within the nonwoven textile prevents the fracturing problem from occurring, however, they continue to contribute to leaking at fastener points for the reasons discussed below.

Mechanically-attached synthetic underlayments which contain thermoplastic materials exhibit varying degrees of dimensional stability when exposed to elevated temperatures. Elevated temperatures are common in roof and flashing assemblies as they are exposed directly to sunlight. Synthetic underlayments described as comprising a cross woven textile tend to exhibit shrinkage rates of 1-3% when exposed to temperatures of 82-degrees C. Underlayments with a nonwoven textile will typically yield shrinkage rates of 0.5~2.0%. When a mechanically-attached underlayment experiences elevated shrinkage rates, the underlayment will contract in between fastening points, resulting in opening between the fastener and the underlayment material. When this occurs, a gasketing function fails to function and results in moisture ingress at fastening points.

Mechanically-attached synthetic underlayments are generally made from polypropylene or polyethylene and have the advantages of being lightweight, high strength and may have non-skid properties on either side of the material. These synthetic materials are typically resistant to UV degradation and can be exposed to weather for periods of from one month to six months without damage thereto which would result in the material failing to function as a moisture shedding barrier.

However, synthetic underlayments have a problem in that they tend to shrink in elevated temperatures which can cause voids to open around the mechanical fasteners making the installed underlayments susceptible to the ingress of moisture. This is a major problem in that the sole function of underlayment materials is to prevent moisture ingress into the housing assembly. To overcome this problem, conventional mechanically-attached underlayments are often installed with proprietary fasteners, which incorporate plastic caps. These proprietary fasteners can help overcome the known problem associated with leaking around fasteners, however, the high cost of the proprietary fasteners increase the installed cost of mechanically-attached synthetic underlayments comprising woven textiles.

Additionally, mechanically-attached synthetic underlayments have a tendency to slide down a sloped roof deck during installation, when weighted. This weighting most typically occurs when installers stand or walk on the material. When this occurs, the underlayment material will sag at fastener points, causing the underlayment to elongate around the fastener, resulting in opening between the fastener and the underlayment material. When this occurs, a gasketing function is impaired, resulting in moisture ingress at fastening points.

U.S. Pat. No. 6,103,356 discloses a nonadhesive laminate comprising a central core sheet of a rubberized-asphalt bitumen membrane having a thin polyester sheet laminated to one side and a polyurethane sheet laminated to an opposite side as a flashing material. However, bituminous membranes have a poor compatibility with sealants, caulks and fluid applied membranes containing high levels of solvents and tend to be very expensive. The present invention has been arrived at in order to overcome these problems.

SUMMARY OF THE INVENTION

The present invention is directed to an economical underlayment material made up of a laminate of a nonwoven thermoplastic fabric having a dimensional stability of less than 1% when exposed to a temperature of 82° C. when tested in accordance with ASTM D 1204 in both the machine- and cross-directions and a thermoplastic barrier layer which provides for an improved deck stability when used in a roofing structure and improved gasketing performance around a mechanical fastener. The underlayment material is in compliance with Section 5.2.1 of AAMA 711-13. The present invention is also directed to a roofing structure comprising an external roofing material and an internal roofing material comprising the inventive underlayment material and a flashing structure comprising a structured substrate and the inventive underlayment material.

BRIEF DESCRIPTION OF THE DRAWINGS

FIG. 3 illustrates a second embodiment of the underlayment material of the present invention.

FIG. 4 illustrates a third embodiment of the underlayment material of the present invention.

DETAILED DESCRIPTION OF THE INVENTION

Figure 1:
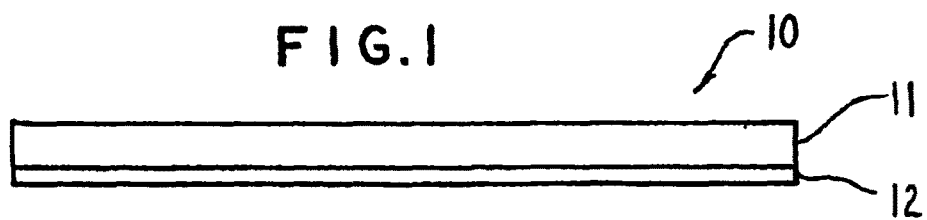
FIG. 1 illustrates the underlayment material of the present invention.

As shown in FIG. 1, the underlayment material 10 of the present invention is made up of two components, a nonwoven textile fabric 11 and a coating or film barrier layer 12. The nonwoven textile fabric is preferably a nonwoven thermoplastic fabric having a dimensional stability of less than 1% when exposed to a temperature of 82° C. when tested in accordance with ASTM D 1204 in both the machine- and cross-directions. The nonwoven fabric is preferably made of a thermoplastic selected from the group consisting of polypropylene, polyethylene, polyester and combinations thereof, with a thermally-bonded spun-bond polypropylene nonwoven fabric being preferred. However, the nonwoven fabric can also be formed from bonding methods including needlepunching, air-laid, hydro-entanglement, chemical bonding and area bonding.

Additionally, suitable additives such as color pigments, inorganic fillers, ultraviolet light stabilizing agents and anti-oxidation stabilizing agents can be compounded into the nonwoven thermoplastic fabric. The color pigments include organic or inorganic color pigments such as carbon black and titanium dioxide, the organic fillers include fillers such as calcium carbonate, the UV stabilizing agents include a hindered amine light stabilizer and the anti-oxidation stabilizing agents include a blend of an organic phosphite having a low volatility and a hindered phenolic anti-oxidant. All of these additives are commercially available and readily obtainable in the commercial market.

The nonwoven thermoplastic fabric may be fabricated with either a melt-additive or topically treated to decrease the surface energy thereof and increase its hydrophobicity. The nonwoven thermoplastic fabric having a dimensional stability of less than 1% when exposed to a temperature of 82° C. when tested in accordance with ASTM D 1204 in both the machine- and cross-directions is also readily available in the commercial market and can be ordered to a particular specification.

As the film barrier layer, thermoplastic materials such as polypropylene, polyethylene, an elastomeric resin such as Vistamaxx 6202™ of ExxonMobil Chemical, polyurethanes, thermoplastic elastomers, ethyl-vinyl acetates, polyamides and mixtures thereof can be used. Additionally, light stabilizers, thermal stabilizers and pigments as additives can be compounded into the thermoplastic film barrier layer. Vistamaxx 6202™ is preferably contained in the film barrier layer in an amount of greater than 30 wt. %, with polypropylene being present at a content no greater than 15% and low-density polyethylene being contained in an amount of greater than 30 wt. %. The same UV light stabilizers, thermal stabilizers and pigments as discussed above for the nonwoven thermoplastic fabric can be used in the film layer.

The film layer is laminated onto the nonwoven thermoplastic fabric by conventional extrusion coating techniques but also may be adhered to through a co-extrusion adhesive, ultrasonic or thermal lamination. The coating of the film component is applied to the underside of the nonwoven thermoplastic fabric to resist sliding downward on a sloped roof deck. The film layer can also be embossed to improve its ability to withstand sliding down a roof deck. Ideally, the finished product will have zero measurable slide down a roof deck having a slope of at least 26.6° when a weight equivalent to an average sized person is applied thereto and comply with Section 5.2.1 of AMAA 711-13 (Water Penetration Around Nails).

The underlayment material can be prepared according to the following process steps. Fabric filaments composed of polypropylene, titanium dioxide, a hindered amine light stabilizer, a blend of organic phosphite of a low volatility and a hindered phenolic antioxidant and an inorganic pigment are extruded, drawn and laid on a moving screen to form a web. The moving screen transports the web to a calendaring station where the pigments are embossed through heat and pressure. The nonwoven fabric is then unwound, transported to an extrusion coating station where the thermoplastic coating is applied thereto. The coating components comprise polypropylene, low-density polyethylene, a propylene-based elastomer, titanium dioxide, a hindered amine light stabilizer, a blend of an organic phosphite of a low volatility and a hindered phenolic antioxidant and an inorganic pigment. The coating is applied to the nonwoven thermoplastic fabric by extruding the film material through a die directly onto the nonwoven fabric. The coated material is then rewound at a rewinding station. The coated material can then be unwound and subjected to printing, rewinding and labeling as suitable.

In a second embodiment of the present invention, as shown in FIG. 3, an additional nonwoven layer 14 can be laminated to the first nonwoven layer 11 through extrusion coating, an adhesive, or ultrasonic or thermal lamination. The second nonwoven layer 14 can be made of a thermoplastic material such as polyethylene, polypropylene, a polyester, and combinations thereof, and can be made of the same material as the first nonwoven layer 11 and also can be formed from bonding methods including needlepunching, air-laid, hydro-entanglement, chemical bonding and area bonding.

In a third embodiment of the present invention, as shown in FIG. 4, a second coating or barrier layer 15 is applied to the opposite side of the nonwoven layer 11 from the first coating or barrier layer 12 to increase the stiffness of the underlayment material. The second coating or barrier layer 15 can be applied to the nonwoven layer 11 in the same manner as the first coating or barrier layer 12 and can be the same material as the first coating or barrier layer 12, and is preferably polypropylene.

Figure 2:
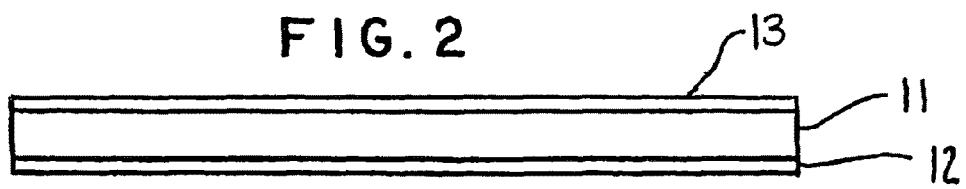
FIG. 2 illustrates a roofing or flashing structure containing the underlayment material of the present invention.

The underlayment material of the present invention can be contained in a flashing structure or a roofing structure comprising an external siding or roofing material 13 mechanically attached to the underlayment material as shown in FIG. 2. The external roofing material is a primary moisture barrier and can be any roof cladding which complies with applicable code requirements such as shingles, tiles, metal roofing and concrete. The external siding material is a primary moisture barrier and can be any siding material which complies with applicable code requirements such as wood, fiber cement and vinyl.

Although preferred embodiments of the present invention are disclosed herein for illustrative purposes, the present invention is not limited thereto and may include equivalent components which function in the roofing structure in the same manner as the described materials.

What is claimed is:

1. An underlayment material made of a laminate of a nonwoven thermoplastic fabric having a dimensional stability of less than 1% when exposed to a temperature of 82° C. when tested in accordance with ASTM D 1204 in both the machine- and cross-directions and a thermoplastic barrier layer, the underlayment material being in compliance with Section 5.2.1 of AAMA 711-13.

2. The underlayment material of claim 1, wherein the nonwoven fabric is selected from the group consisting of polypropylene, polyethylene, polyester, and combinations thereof.

3. The underlayment material of claim 1, wherein the nonwoven thermoplastic fabric comprises at least one additive selected from the group consisting of a color pigment, an inorganic filler, an ultraviolet light stabilizing agent and an anti-oxidation stabilizing agent.

4. The underlayment material of claim 1, wherein the thermoplastic barrier layer comprises at least one material selected from the group consisting of polypropylene, polyethylene, an elastomeric resin, polyurethane and polyamide.

5. The underlayment material of claim 1, wherein the thermoplastic barrier layer is extrusion-coated onto the nonwoven thermoplastic fabric.

6. The underlayment material of claim 1, additionally comprising a second nonwoven thermoplastic fabric laminated to the thermoplastic barrier layer.

7. The underlayment material of claim 1, additionally comprising a second thermoplastic barrier layer laminated to the nonwoven thermoplastic fabric.

8. A roofing structure comprising a laminate of a nonwoven thermoplastic fabric having a dimensional stability of less than 1% when exposed to a temperature of 82° C. when tested in accordance with ASTM D 1204 in both the machine- and cross-directions and a thermoplastic barrier layer mechanically attached to a roofing material.

9. The roofing structure of claim 8, wherein the laminate has zero measurable slide down a roof deck having a slope of 26.6° when a weight equivalent to an average person is applied thereto.

10. The roofing structure of claim 8, wherein the roofing material is selected from the group consisting of shingles, tiles, metal roofing and concrete.

11. A flashing structure comprising the underlayment material of claim 1 mechanically attached to a building structure.

* * * * *